Oct. 10, 1967 D. C. HANNA ETAL 3,345,666
CAR WASHING APPARATUS
Filed Feb. 9, 1966 2 Sheets-Sheet 2
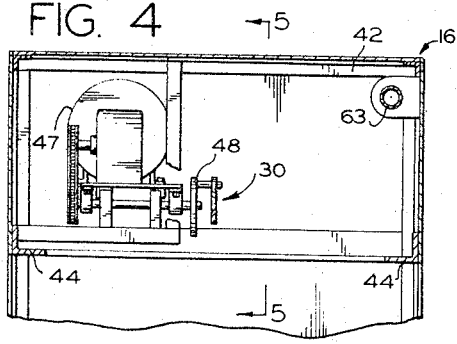
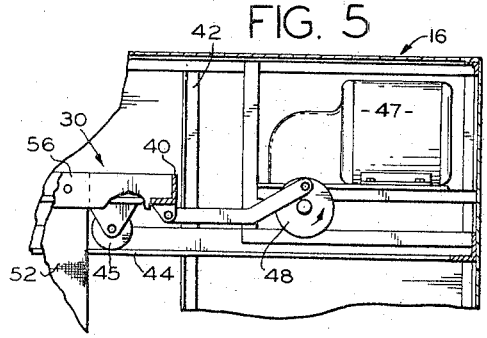
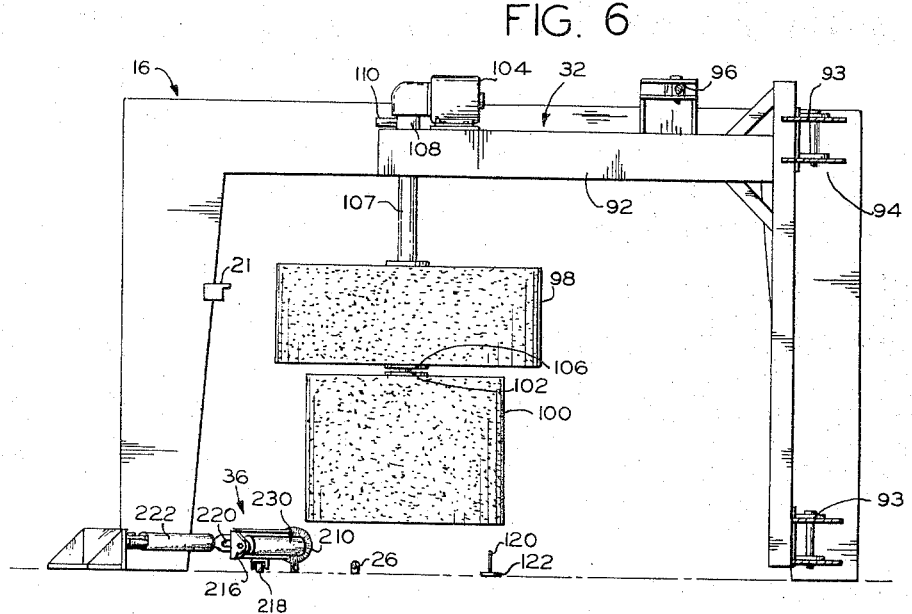
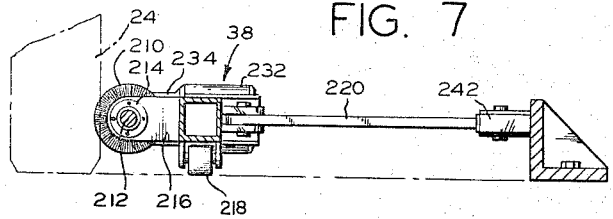
DANIEL C. HANNA
JACK F. EBELING
INVENTORS
BY
BUCKHORN, BLORE, KLARQUIST & SPARKMAN
ATTORNEYS

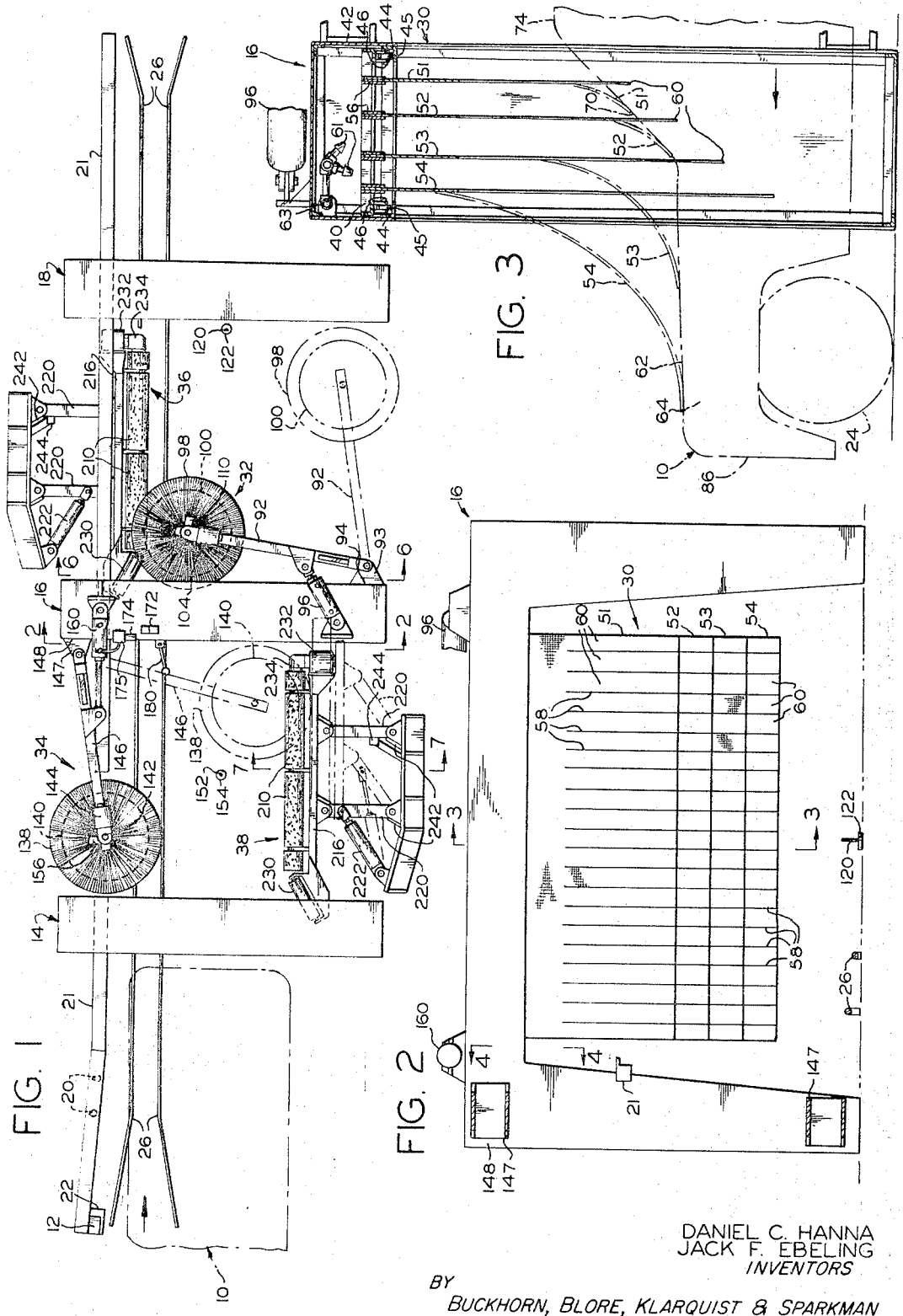

3,345,666
CAR WASHING APPARATUS
Daniel C. Hanna, 2020 SE. 82 Ave., Portland, Oreg. 97216, and Jack F. Ebeling, Portland, Oreg.; said Ebeling assignor to said Hanna
Filed Feb. 9, 1966, Ser. No. 526,162
2 Claims. (Cl. 15—21)

ABSTRACT OF THE DISCLOSURE

A car to be washed is advanced, with its left wheels in a track 26, sequentially through a soaping arch 14, into engagement with and past a right wheel brusher 38 and a left side and rear end brushing mechanism 34, through a friction scrubbing arch 16, into engagement with and past a left wheel brusher 36 and a front end and right side brushing mechanism 32, and through a rinsing arch. The wheel brushers 38 include longitudinal rotary brushes carried by a wheeled carriage, guided by parallelogram linkages and having angled deflecting rollers 230. A friction scrubber 30 (FIGS. 2 and 3) includes a plurality of suspended sheets of wetted felt-like material of different lengths and slit into ribbons. A carrying frame reciprocates the sheets edgewise to scrub the car. The left side and rear end brushing mechanism 34 (FIG. 1) has an arm 146 which initially extends rearwardly to position rotary brushes 138 and 140 of different diameters to engage the left side of the car, and, after a feeler 180 is engaged by the car and the side of the car clears the brushes 138 and 140, a cylinder drive 160 moves the arm 146 to swing the brush forwardly with and substantially completely across the rear end of the car to brush the entire rear end of the car. Rotary brushes 98 and 100 are carried by arm 92 initially in a position to be engaged by the left front corner of the car, and, when pushed by the car, swing the arm forwardly and toward the right side against the action of a resilient device 96. After the entire front end is scrubbed and the brushes 98 and 100 clear the right front corner of the car, the brushes brush the right side of the car.

Description

This invention relates to an improved car washing apparatus, and more particularly to an apparatus for scrubbing a car.

An object of the invention is to provide a new and improved car washing apparatus.

Another object of the invention is to provide a new and improved apparatus for scrubbing a car.

A further object of the invention is to provide a car washing apparatus adapted to automatically scrub the top surfaces, the front and rear ends and the wheels of a car.

A further object of the invention is to provide a car washing apparatus having a sheet-like scrubbing means adapted to drape on the top portions of a car advanced therepast.

Yet another object of the invention is to provide a car washing apparatus including a rotary brush means movable with and across an entire end of a car as the car is advanced.

A still further object of the invention is to provide a car washing apparatus having a lower rotary brush adapted to scrub the lower, side portions of a car and an upper rotary brush for scrubbing the side windows of the car.

Another object of the invention is to provide a car washing apparatus having a pair of elongated, rotary, wheel-scrubbing brushes urged by parallelogram linkage carriers toward the wheels with angled rollers carried by the carriages in the paths of the wheels for moving the brushes to the sides of the wheels as the wheels move forwardly to the brushes.

The invention provides an improved car washing apparatus adapted to automatically scrub a car as the car is advanced therethrough. The apparatus preferably includes a sheet-like scrubbing member depending from and moved back and forth by a carrier in a position in which slit lower ends of the member lie on and are moved back and forth across the top of the car as the car is advanced therepast. There also preferably is provided two side scrubbers, each including an arm positioned above the path of the car and carrying a vertical brush and adapted to position the brush to scrub a side of the car and move the brush across one end of the car and forwardly with the car as the car is advanced to scrub that end of the car. The brush may have a lower portion for scrubbing the side and an upper portion for scrubbing the side windows and rotated only when the front portion of the car has passed the brush. There also is preferably provided a pair of wheel-scrubbing brushes which are urged against the wheels by parallelogram linkages which are moved from extreme positions in the paths of the wheels by inclined rollers carried by the linkages.

A complete understanding of the invention may be obtained from the following detailed description of an improved car washing apparatus forming a specific embodiment thereof, when read in conjunction with the appended drawings, in which:

FIG. 1 is a top plan view of an improved car washing apparatus forming one embodiment of the invention;

FIG. 2 is an enlarged, vertical sectional view taken substantially along line 2—2 of FIG. 1;

FIG. 3 is an enlarged, vertical sectional view taken substantially along line 3—3 of FIG. 2;

FIG. 4 is an enlarged, vertical sectional view taken substantially along line 4—4 of FIG. 2;

FIG. 5 is an enlarged, vertical sectional view taken substantially along line 5—5 of FIG. 4;

FIG. 6 is an enlarged, vertical sectional view taken substantially along line 6—6 of FIG. 1; and FIG. 7 is an enlarged, vertical sectional view taken along line 7—7 of FIG. 1.

Referring now in detail to the drawings, there is shown therein an improved car washing apparatus constructed in accordance with the invention and in which a car 10 is driven sequentially past a coin-operated mechanism 12 (FIG. 1), a soaping arch 14, a scrubbing arch 16 and a rinsing arch 18, which are operated automatically in sequence as the car is driven therethrough in timed relationship to operation of electric lamps 20 of a light bar 21 operated sequentially by a controller 22, which is started in a cycle of operation by the coin-operated mechanism. Left wheels 24 (FIG. 3) of the car are guided by a track 26 to cause the car to move along a predetermined path. Certain features of the coin-operated mechanism, the controller, the lamps, the soaping arch and the rinsing arch are disclosed and claimed in copending application Ser. No. 526,161, filed Feb. 9, 1966, and assigned to the same assignee as the instant application. As the car is so driven through the apparatus as to keep the driver abreast of the latest lighted lamp 20 (FIG. 1), the car is drenched with soapy water at the soaping arch, the top surfaces, the side surfaces, the front end, the rear end and the sides of the wheels thereof all are scrubbed at the scrubbing arch, and the car is thoroughly rinsed with hot, clear water at the rinsing arch.

The scrubbing arch 16 (FIG. 1) is provided to insure cleaning of very dirty cars and includes a top scrubber 30, a front end and right side scrubber 32, a rear end and left side scrubber 34 and a pair of wheel scrubbers 36 and 38. The top scrubber includes an overhead carrier frame 40 (FIG. 3) mounted for reciprocation at the top of an arch framework 42 by guides or tracks 44 extending crosswise of the path of the car and above the car. The carrier frame 40 is supported by rollers 45, is guided by side thrust rollers 46, and is reciprocated by an electric motor 47 and a crank drive 48.

The top scrubber 30 includes depending, ribboned scrubbing sheets 51, 52, 53 and 54 (FIGS. 2 and 3) which are progressively shorter in length proceeding from front to rear (from right to left as viewed in FIG. 3) in the arch 16. Each of the sheets preferably is composed of a thick, flexible felt-like material or cloth, one excellent material being a felt-like material about five-sixteenths of an inch in thickness and sold for carpeting pads under the trademark "Ozite." The sheets are secured to the carrier frame by releasable clamps 56. All except the upper end portions of the sheets have vertical slits 58 (FIG. 2) to form ribbons or strands 60, and the sheets preferably are each of a width greater than the width of the car 10. The ribbons are preferably about two inches wide and are preferably about several feet in length. Nozzles 61 supplied with hot, soapy water by pipes 63 spray the soapy water onto the wick-like sheets 51 to 54.

The sheet 54 (FIG. 3) preferably is of a length such that the lower ends of its ribbons are normally positioned substantially below a top surface 62 of a hood 64 of the car and such that, as the hood is moved therepast and pulls by friction the lower end of the sheet 54 to the left, as viewed in FIG. 3, a substantial length of each ribbon 60 of the sheet 54 lies on the top of the hood and scrubs the top of the hood as the sheet 54 is reciprocated several inches back and forth crosswise of the car.

The sheet 53 is shorter than the sheet 54 and is of such a length that the lower end or tip portions of the ribbons 60 thereof touch the top of the hood. The sheet 52 is shorter yet and is of such a length that the lower tips of its ribbons 60 clear the top of the hood by a few inches. The ribbons of the sheet 52 engage and scrub windshield 70 of the car and give a slapping, vigorous scrubbing action to the windshield and particularly to the curved side portions of the windshield, the carrier frame 40 preferably being reciprocated about forty times per minute.

The sheet 51 is the shortest and is of a length such that, for a car of average height, several inches of the length of each of its ribbons lies on a top 74 of the car as the top 74 travels past the sheet 51. The ribbons 60 of the sheet 51 vigorously scrub the top 74. Since the sheets 51, 52, 53 and 54 are progressively longer and are engaged by the car at points progressively farther along in the direction of advancement of the car, the drag of the car on the flexible sheet 54 pulls its lower portion angularly away from the sheet 53, the drag on the sheet 53 pulls it angularly away from the sheet 52 and the drag on the sheet 52 pulls it angularly away from the sheet 51. This separates the ribbons 60 of the several sheets to make the ribbons of each sheet free to engage the car and permit the ribbons of each sheet to move freely without interference from the other sheets. This maximizes the scrubbing efficiency of each sheet. Nozzles 61 supplied with hot water by pipe 63 thoroughly wet the sheets 51 to 54.

As the car is driven along the track 26 to and through the scrubbing arch 16, the forward part of the hood 64 and the top surface 62 thereof are scrubbed by the ribbons 60 of the sheet 54, the top surface 64 is scrubbed by the tips of the ribbons 60 of the sheet 53, the windshield also is scrubbed by the ribbons 60 of the sheets 53 and 52, the top of the car is scrubbed by all four sheets 51 to 54, the rear window (not shown) of the car is scrubbed by the sheets 53 and 54.

The scrubber 32 (FIGS. 1 and 6) is provided for automatically scrubbing front end 86, the right side and right side windows of the car 10, and includes an arm 92 pivotal by hinges 93 on the rear side of a vertical portion 94 of the arch 16 and at the right side of the path of the car. The arm 92 can be swung or folded to lie along the rear face of the arch for shipping purposes. The arm 92 is positioned above the top of the car and is urged by resilient device 96 such as a pneumatic cylinder or spring toward a normal position extending diagonally forwardly and across the path of the car to locate rotary upper and lower brushes 98 and 100 preferably having string-like bristles and carried by the free end of the arm in the path of the left portion of the front of the car. The lower brush 100 is fixedly mounted on a vertical shaft 102 of an electric motor power drive unit 104 mounted on the free end of the arm, and the upper brush 98 is rotatably mounted on the shaft 102 by a radial-and-thrust bearing 106 and a sleeve shaft 107, and is connectable to the shaft 102 for driving thereby by a clutch 108 when a solenoid winding 110 is energized to actuate the clutch.

As the car 10 (FIGS. 1, 3) approaches the brushes 98 and 100 (FIGS. 1 and 6), the controller 22 causes the drive unit 104 to be energized to drive the brush 100, the solenoid winding being de-energized at this time so that the brush 98 is not rotated. Then, the front, lefthand portion of the car engages the brush 100 and pushes the brush 100 forwardly along the path of the car, which swings the arm 92 clockwise, as viewed in FIG. 1, to move the brushes 98 and 100 across the front end of the car to clean the front end of the car. When the brush 100 has been moved to the right side of the car, the car moves along the brush which is urged by the device 96 against the right side of the car. The brush 100, being of a height to just reach the lower edge portions of the side windows and just below the lower edges of the fenders and rocker panel of the car, scrubs all the right side of the car except the side windows.

The upper brush 98 is not rotated until the side window reaches it so that any aerial or other attachments on the front of the car are not dislocated by engagement with the brush 98. The brush 98 is larger in diameter than the brush 100 so as to reach the inwardly and upwardly sloping side windows and just before the front one of the side windows comes to the brush 98, a feeler 120 (FIGS. 1 and 6) of switch 122 mounted in the path of the car is actuated by the car to actuate the switch 122 to actuate the clutch 108 (FIG. 6) to drivingly connect the shaft 107 of the brush 98 to the shaft 102. The brush 98 then is rotated and scrubs the side windows. When the car moves beyond the feeler 120, the feeler swings back to open the switch 122 to disengage the clutch. After the car has passed the brush 100, the arm 92 is swung by the cylinder device 96 back to its normal position.

The rear end and lefthand scrubber 34 (FIG. 1) is located in front of the scrubbing arch 16 and include upper and lower rotary brushes 138 and 140, which, like the brushes 98 and 100, are movable from side scrubbing positions at the left side of the car 10, crosswise of the car and forwardly with the car after the left side of the car clears the brush 140, the brush 140 being kept in engagement with the rear end of the car as the car moves forwardly. The brush 140 is carried by a vertical shaft 142 of a motor 144 carried by the free end of an arm 146 hinged by hinges 147 to the front side of a vertical frame portion 148 of the arch 16 at one side of the path of the car and just ahead of the sheet 51. The arm 146 is foldable or pivotal to a position lying alongside the front of the arch 16 for shipping purposes. The brush 138 is journaled on the shaft 142 by a sleeve (not shown) and a radial-and-thrust bearing (not shown) and is freely rotatable on the shaft 142 except while the left side windows of the car are engaged by the brush 138, during which time a feeler 152 (FIG. 1) of a switch 154 mounted in the path of the car is actuated by the car to close the switch 154 to energize a solenoid winding 156 to cause engagement of a clutch (not shown) to connect the shaft 142 drivingly to the brush 138.

The arm 146 is urged in a counterclockwise direction as viewed in FIG. 1, by a cylinder device 160. As the car 10 approaches the brushes 138 and 140, the arm 146 is held in a side scrubbing position extending substantially parallel to and rearwardly relative to the direction of travel of the car by liquid in the blind end of the cylinder device 160 to limit counterclockwise movement of the arm while permitting the brushes 138 and 140 to engage the left side and windows of the car. Then, as the feeler 152 is actuated to close the switch 154, the switch 154 causes energization of a holding relay 172 to energize a solenoid winding 174 of a valve 175 to set the valve 175 to permit the liquid in the blind end of the cylinder device to be pushed out of the cylinder device into an accumulating tank (not shown). Then, as the left side of the car clears the brush 140, the arm 146 is swung by the air under pressure supplied to the rod end of the cylinder device to move the brush 140 behind, against and across the rear end of the car to scrub the rear end of the car, the brush 140 being moved across and forwardly with the car to keep in engagement with the car as the arm is so swung.

When the brush 140 has moved across the entire width of the car, the arm engages a limit switch 180 which drops out the holding relay 172 to de-energize the solenoid winding 174 closing off the supply of air and permitting the liquid under pressure to be supplied to the blind end of the cylinder device 160 to move the arm 146 back toward its normal position. The scrubber 34 then is in its starting condition ready for the next car to be washed.

The wheel scrubbers 36 and 38 (FIGS. 1, 6 and 7) are like each other but are allochiral. Each of the wheel scrubbers includes a series of rotary brushes 210 keyed to an elongated shaft 212 journaled in bearings 214 carried by a forked frame 216 supported by rollers 218. The frame 216 forms with arms 220 a parallelogram linkage, which is urged by a pneumatic cylinder device 222 toward a normal position in which the brushes extend to and are parallel to the path of the car, and the arms 220 extend angularly toward and forwardly relative to the path of the car. An inclined roller 230 carried by the frame is engaged by the front wheel of a wider car and pushes the frame and the brushes back out of the path sufficiently that the brushes engage the outside side of the wheel. The shaft 212 is rotated by a motor 232 and a power train 234 to cause the brushes to scrub the outside side of the wheel thoroughly as the wheel rolls therealong. The brushes are positioned sufficiently low to clear the rocker panel of the car, and engage the wheel in a horizontal swath of a width from a point above the center of the wheel to a point below the periphery of the rim of the wheel proper, the brushes being in engagement with the entire portions in the swath of the outside faces of the tire, the hub cap and the wheel proper. As the wheel rolls along the path and the brushes 210 are rotated, tht entire outside face of the wheel is thoroughly scrubbed, the overall length of the brushes of each scrubber preferably being about eight feet. When the rear wheels of the car clear the brushes, the cylinder devices 222 urge the brushes 210 back to their normal positions, stops 242 limiting the extent of movement into the path. A limit switch 244 is engaged by one of the arms 220 to stop the motor 232 when the stop 242 is engaged and turns on the motor when the arm 220 is swung away from the stop.

The above-described car washing apparatus is especially designed to clean very dirty cars as well as cars only slightly dirty, and thoroughly scrubs the car. The apparatus is entirely automatic and requires no attendant. The apparatus has maximum scrubbing efficiency with minimum mechanism.

It is to be understood that the above-described arrangements are simply illustrative of the application of the principles of the invention. Numerous other arrangements may be readily devised by those skilled in the art which will embody the principles of the invention and fall within the spirit and scopt thereof.

What is claimed is:
1. In a car washing apparatus,
   an elongated rotary brush,
   a wheeled carriage,
   means mounting the rotary brush on the carriage for rotation on a horizontal axis,
   means on the carriage for rotating the brush,
   base means,
   a pair of parallel links connected to the base means and the carriage for movement between a first position in which the brush extends into and along a predetermined path of a car advanced along said path and a second position in which the brush is at the side of the car and engages the side of a wheel of the car,
   means urging the carriage toward the first position thereof,
   and means carried by the carriage in the path of a wheel of the car when the frame means is in the first position thereof for moving the frame means to the second position thereof as the wheel moves abreast of the brush.
2. In a car washing apparatus,
   an elongated shaft,
   brush means keyed to the shaft,
   forked frame means journaling the shaft in a horizontal position,
   wheel means supporting the frame means,
   motor means on the frame means for rotating the shaft,
   a base,
   a plurality of arms pivoted to the base and to the frame means and forming a parallelogram linkage therewith,
   means urging the linkage toward a first position in which the brush means extends into and along a predetermined path of a car advanced along the path and a second position in which the brush means is at the side of the car and engages the side of a wheel of the car,
   and means carried by the frame means in the path of a wheel of the car when the frame means is in the first position thereof for moving the frame means to the second position thereof as the wheel moves abreast of the brush.

References Cited
UNITED STATES PATENTS

| | | | |
|---|---|---|---|
| 1,412,732 | 4/1922 | Young. | |
| 1,908,788 | 5/1933 | Pulliam | 15—97 |
| 2,705,810 | 4/1955 | McDermott | 15—21 |
| 2,822,564 | 2/1958 | Crivelli | |
| 2,910,202 | 10/1959 | Clarke et al. | |
| 3,037,223 | 6/1962 | Lovsey | 15—21 |
| 3,037,224 | 6/1962 | Webster | 15—21 |
| 3,058,133 | 10/1962 | Haverberg | 15—21 |
| 3,089,168 | 5/1963 | Blanford | 15—4 |
| 3,160,903 | 12/1964 | Grass | 15—97 |
| 3,208,089 | 9/1965 | Vani | 15—21 |
| 3,241,167 | 3/1966 | Murillo et al. | 15—21 |

FOREIGN PATENTS
763,069   12/1956   Great Britain.

CHARLES A. WILLMUTH, *Primary Examiner.*
E. L. ROBERTS, *Assistant Examiner.*